US009039234B2

(12) United States Patent
Kasuga

(10) Patent No.: US 9,039,234 B2
(45) Date of Patent: May 26, 2015

(54) ILLUMINATION APPARATUS

(71) Applicant: SEIKO EPSON CORPORATION, Tokyo (JP)

(72) Inventor: Hirofumi Kasuga, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 53 days.

(21) Appl. No.: 14/043,480

(22) Filed: Oct. 1, 2013

(65) Prior Publication Data

US 2014/0098303 A1    Apr. 10, 2014

(30) Foreign Application Priority Data

Oct. 9, 2012  (JP) ................. 2012-223883

(51) Int. Cl.
*F21V 33/00* (2006.01)
*G02F 1/13* (2006.01)
*F21K 99/00* (2010.01)
*F21V 23/04* (2006.01)
*G03B 21/00* (2006.01)
*F21Y 101/02* (2006.01)
*F21Y 111/00* (2006.01)
*F21V 29/02* (2006.01)

(52) U.S. Cl.
CPC .......... *F21V 33/0052* (2013.01); *G02F 1/1313* (2013.01); *F21K 9/135* (2013.01); *F21V 23/04* (2013.01); *G03B 21/00* (2013.01); *F21Y 2101/02* (2013.01); *F21Y 2111/005* (2013.01); *F21V 29/027* (2013.01)

(58) Field of Classification Search
CPC ..... F21V 33/0052; F21V 33/00; F21V 23/04; F21V 29/027; G02F 1/1313; G02F 1/13; G02F 1/1334; G02F 1/13357; F21S 2/00; G03B 21/00; G03B 21/14; F21K 9/135
See application file for complete search history.

(56) References Cited

U.S. PATENT DOCUMENTS

| 5,541,820 A * | 7/1996 | McLaughlin | 362/253 |
| 6,869,208 B2 * | 3/2005 | Vogel et al. | 362/363 |
| 7,871,192 B2 * | 1/2011 | Chien | 362/641 |
| 8,636,389 B2 * | 1/2014 | Knappschneider | 362/431 |
| 2013/0002687 A1 * | 1/2013 | Conti | 345/501 |

(Continued)

FOREIGN PATENT DOCUMENTS

| JP | 2006-086024 A | 3/2006 |
| JP | 2006-127845 A | 5/2006 |
| JP | 2011-095309 A | 5/2011 |

*Primary Examiner* — Bao Q Truong
(74) *Attorney, Agent, or Firm* — Maschoff Brennan

(57) ABSTRACT

An illumination apparatus having an illumination function and an image projection function includes a light source for illumination, an image projection section including a light source portion having a light source for image projection different from the light source for illumination, an image formation portion that modulates light from the light source portion based on image information to be projected to form an image, and a projection lens that enlarges and projects the image, a connection section electrically connectable to an illumination apparatus fixture, a lamp cover attached to the connection section, accommodating the light source for illumination and the image projection section, and having a light transmissive portion that transmits illumination light from the light source for illumination and the image projected from the image projection section, and a control section having a function of controlling the light source for illumination and the image projection section.

8 Claims, 8 Drawing Sheets

(56) References Cited

U.S. PATENT DOCUMENTS

2014/0043544 A1* 2/2014 Kasuga .......................... 348/744
2014/0198949 A1* 7/2014 Garlington et al. ............ 382/103
2014/0347266 A1* 11/2014 Kasuga .......................... 345/156

* cited by examiner

ILLUMINATION APPARATUS

The entire disclosure of Japanese Patent Application No. 2012-223883, filed Oct. 9, 2012 is expressly incorporated by reference herein.

BACKGROUND

1. Technical Field

The present invention relates to an illumination apparatus having an illumination function and an image projection function.

2. Related Art

There is a known illumination apparatus of related art having an illumination function and an image projection function (see JP-A-2006-127845 and JP-A-2006-86024, for example). The illumination apparatus disclosed in JP-A-2006-127845 and JP-A-2006-86024 (referred to as illumination apparatus of related art) each have a configuration in which a projector in the form of an image projection section is provided on an inner wall surface of a globe provided in the illumination apparatus and the projector can project an image (hereinafter sometimes referred to as image projection) when a light source for illumination does not emit light.

Specifically, the illumination apparatus of related art each include an illuminator having a light emitter, such as a fluorescent lamp and a miniature light bulb, the globe, which covers the illuminator, and the image projection section. A user usually turns on the light emitter, such as a fluorescent lamp and a miniature light bulb, and uses it as the illuminator, whereas turning off the light emitter, such as a fluorescent lamp and a miniature light bulb, to allow the image projection section to perform image projection. An image projected by the image projection section is projected on the inner or outer surface of the globe.

Each of the illumination apparatus of related art is, however, capable of performing image projection only when the illuminator is powered off, that is, the light emitter, such as a fluorescent lamp and a miniature light bulb, is turned off, which means that no image projection can be performed when the illuminator of related art is used as an illuminator, whereas the illumination apparatus is unable to function as an illuminator when image projection is performed. The illumination apparatus of related art can therefore perform image projection only when the illuminator provides no illumination. To perform image projection in a room under a certain degree of illuminance, it is therefore necessary to turn on another illumination apparatus different from the illumination apparatus of related art.

The illumination apparatus of related art having an illumination function and an image projection function can provide the illumination function and the image projection function in a limited sense and are hence problematic in that the illumination function and the image projection function cannot be used in a variety of ways in accordance with a variety of situations.

SUMMARY

An advantage of some aspects of the invention is to provide an illumination apparatus having an illumination function and an image projection function that can be used in a variety of ways in accordance with a variety of situations.

[1] An illumination apparatus according to an aspect of the invention has an illumination function and an image projection function, and includes a light source for illumination, an image projection section including a light source portion having a light source for image projection different from the light source for illumination, an image formation portion that modulates light from the light source portion based on image information to be projected to form an image, and a projection lens that enlarges and projects the image formed by the image formation portion on a projection surface, a connection section electrically connectable to an illumination apparatus fixture, a lamp cover attached to the connection section, accommodating the light source for illumination and the image projection section, and having a light transmissive portion that transmits illumination light from the light source for illumination and the image projected from the image projection section, and a control section having a function of controlling the light source for illumination and the image projection section.

According to the illumination apparatus of the aspect of the invention, the image projection section includes a light source for image projection different from a light source for illumination, and the control section has a function of controlling the light source for illumination and the image projection section independently of each other. The aspect of the invention therefore allows only illumination, only image projection, or simultaneous illumination and image projection to be performed, whereby the illumination apparatus having an illumination function and an image projection function can be used in a variety of ways.

Further, since the connection section of the illumination apparatus according to the aspect of the invention is electrically connectable to an existing illumination apparatus fixture, the illumination apparatus of the aspect of the invention can be readily attached to the illumination attachment fixture as in a case where a typical illumination apparatus is attached. Moreover, since the illumination apparatus of the aspect of the invention can also be readily removed, the location where the illumination apparatus is installed can be readily changed.

[2] In the illumination apparatus according to the aspect of the invention, it is preferable that the lamp cover has a rear end attached to the connection section and the light transmissive portion in an area including a front end facing way from the rear end, and the image projection section is so disposed that an optical axis thereof coincides with a central axis of the lamp cover that passes through the rear end of the lamp cover and the front end of the lamp cover.

The configuration described above allows the illumination apparatus to be reduced in size. Further, since image projection can be performed in a direction along the central axis of the lamp cover, the position where an image is projected is readily set, whereby an illumination apparatus having excellent operability can be provided.

[3] In the illumination apparatus according to the aspect of the invention, it is preferable that the lamp cover has a rear end attached to the connection portion and the light transmissive portion in an area including a front end facing way from the rear end, and the light source for illumination is formed of a plurality of solid-state light sources not only disposed in positions set apart from an area through which the image projected from the image projection section passes but also so disposed that the light sources surround the central axis of the lamp cover that passes through the rear end of the lamp cover and the front end of the lamp cover.

The configuration described above prevents the light from the light source for illumination from interfering with the image projected from the image projection section. Further, the light emitted from the light source for illumination can spread over a wide range.

[4] In the illumination apparatus according to the aspect of the invention, it is preferable that the control section is capable of controlling the light source for illumination and the image projection section independently of each other and selectively setting any of the functions: an illumination function of performing illumination by using the light source for illumination; an image projection function of performing image projection by using the image projection section; and an illumination/image projection function of performing both the illumination function and the image projection function in a combined manner.

The control section having the function described above allows only illumination, only image projection, or simultaneous illumination and image projection to be performed, whereby the illumination apparatus having an illumination function and an image projection function can be used in a variety of ways.

[5] In the illumination apparatus according to the aspect of the invention, it is preferable that at least an image transmitting area which is part of the light transmissive portion of the lamp cover and through which the image projected from the image projection section passes is made of a polymer dispersed liquid crystal material (PDLC), and an area which is the remainder of the light transmissive portion of the lamp cover and is not made of the polymer dispersed liquid crystal material is formed of a light diffusing member capable of diffusing the illumination light from the light source for illumination.

The configuration described above allows a user to set the light transmissive portion of the lamp cover in an optimum state as appropriate in accordance with user's intention of performing illumination or image projection.

[6] In the illumination apparatus according to the aspect of the invention, it is preferable that the control section further has a function of controlling the polymer dispersed liquid crystal material in such a way that the polymer dispersed liquid crystal material is made transparent when the image projection section projects an image.

The control described above allows the projected image in an image projection mode to pass through the transparent polymer dispersed liquid crystal material, whereby a sharp image can be projected on the projection surface (surface of table, for example).

[7] In the illumination apparatus according to the aspect of the invention, it is preferable that the control section further has a function of controlling the polymer dispersed liquid crystal material in such a way that the polymer dispersed liquid crystal material diffuses light when the image projection section projects no image.

The control described above allows the entire light transmissive portion in the mode in which no image projection is performed but only illumination is performed to diffuse light, whereby the illumination light can be diffused over a wide range.

[8] In the illumination apparatus according to the aspect of the invention, it is preferable that the connection section is connectable to any of a light bulb attachment socket, a light bulb attachment receptacle, a hooking rosette, and a hooking ceiling.

Using the connection section described above as the connection section of the illumination apparatus according to the aspect of the invention allows the illumination apparatus according to the aspect of the invention to be attached to a variety of types of illumination apparatus fixture. Further, since the illumination apparatus of the aspect of the invention can also be readily removed, the location where the illumination apparatus is installed can be readily changed.

BRIEF DESCRIPTION OF THE DRAWINGS

The invention will be described with reference to the accompanying drawings, wherein like numbers reference like elements.

DESCRIPTION OF EXEMPLARY EMBODIMENTS

An illumination apparatus according to embodiments of the invention will be described below.

First Embodiment

Figure 1:
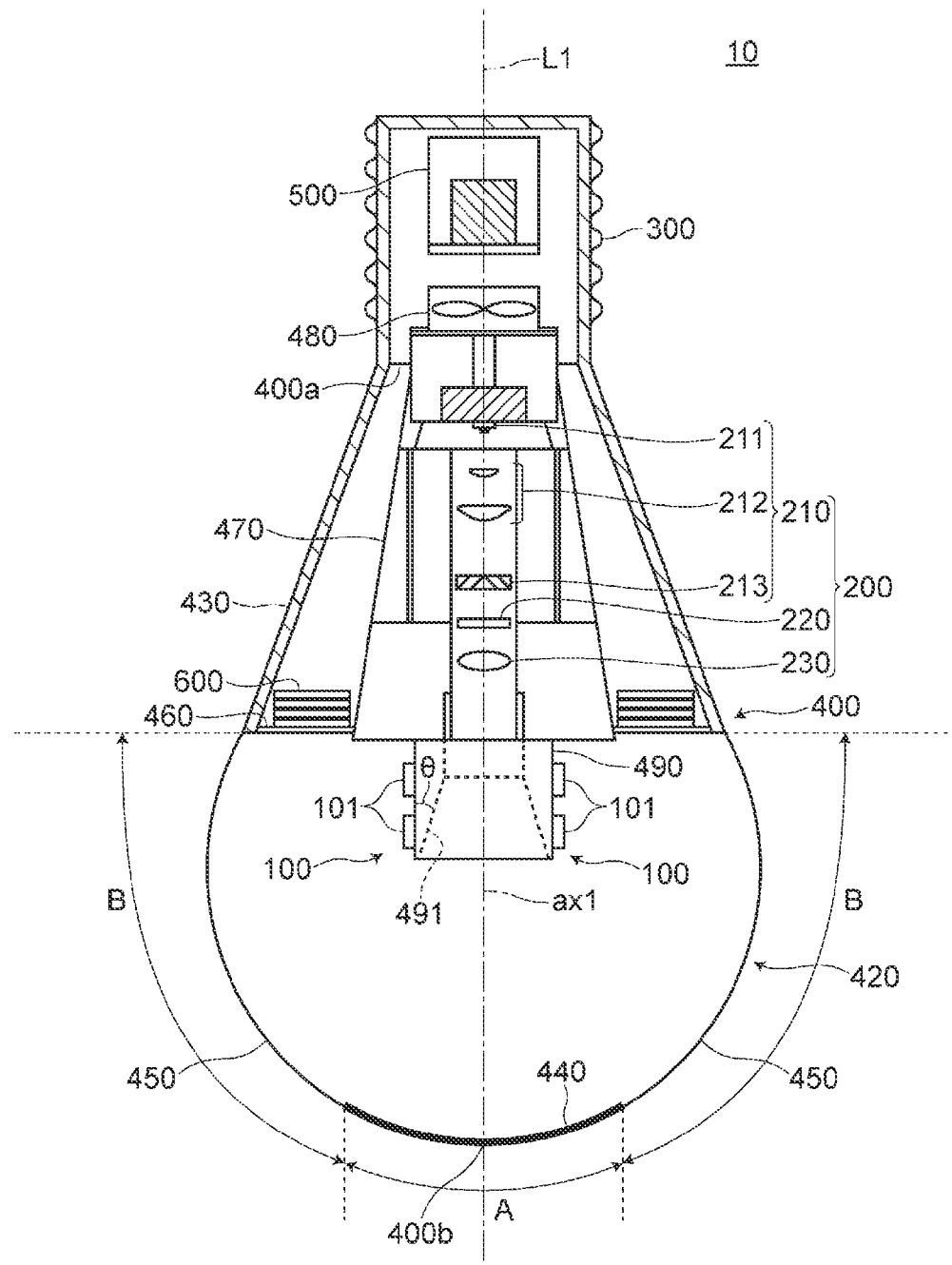
FIG. 1 is a descriptive diagram of an illumination apparatus according to a first embodiment.

FIG. 1 is a descriptive diagram of an illumination apparatus 10 according to a first embodiment. The illumination apparatus 10 according to the first embodiment is an illumination apparatus having an illumination function and an image projection function and includes a light source for illumination (hereinafter referred to as illumination light source) 100, an image projection section 200, a connection section 300, which is electrically connectable to an existing illumination apparatus fixture, a lamp cover 400, which accommodates the illumination light source 100 and the image projection section 200, a power source section 500, which receives electric power (commercial electric power) as an input via the connection section 300, and a control section 600, which has a function of controlling the illumination light source 100 and the image projection section 200. The lamp cover 400 further accommodates the power source section 500 and the control section 600. In FIG. 1, no electric wiring is shown.

The illumination apparatus 10 according to the first embodiment has an exterior shape substantially the same as that of a typical commercially available light-bulb-shaped LED lamp (hereinafter sometimes referred to as LED bulb), as shown in FIG. 1.

The illumination light source 100 is formed of a plurality of solid-state light sources (assumed to be LEDs) 101. The arrangement and other factors of the plurality of LEDs 101 will be described later.

The image projection section 200 is a compact projector called a pico projector and includes a light source portion 210 having a light source for image projection (assumed to be white light emitting diode) 211, which differs from the illumination light source 100, a collimator system 212, and a polarization conversion element 213; an image formation portion 220, which modulates light from the light source portion 210 based on image information to be projected to form an image; and a projection lens 230, which enlarges and projects the image formed by the mage formation portion 220 on a projection surface (not shown, such as surface of table). In FIG. 1, the components of the image projection section 200 are simplified and diagrammatically shown.

The light source for image projection 211 (hereinafter referred to as image projection light source 211), a detailed description of which will not be made here, emits white light containing red light, green light, and blue light. The collimator system 212 is an optical element that parallelizes the light emitted from the image projection light source 211. The polarization conversion element 213 is an element that converts the light having passed through the collimator system 212 into polarized light. The polarization conversion element 213 includes a polarization separation layer that directly transmits one linearly polarized light component of the polarized light components of the light incident on the polarization conversion element 213 and reflects another linearly polarized light component in a direction perpendicular to an optical axis ax1, a reflection layer that reflects the other linearly polarized light component reflected off the polarization separation layer in the direction parallel to the optical axis ax1, and a wave plate that converts the other linearly polarized light component reflected off the reflection layer into the one linearly polarized light component.

The image formation portion 220 includes a transmissive liquid crystal light modulator as a light modulator. The image formation portion 220 is therefore also called a liquid crystal light modulator 220 in the following description. The liquid crystal light modulator 220 modulates the light from the light source portion 210 in accordance with image information to be projected and outputs resultant full-color image light. The liquid crystal light modulator 220 includes a color filter (not shown). The color filter has a function as a color separation system that separates the light from the light source portion 210 into red light, green light, and blue light on a pixel basis. The color separation system is not necessarily a color filter but may be any other suitable color separation system.

The liquid crystal light modulator 220 further includes a light-incident-side polarizer (not shown) disposed on the side where the polarization conversion element 213 is present and a light-exit-side polarizer (not shown) disposed on the side where the projection lens 320 is present. The color light fluxes are modulated by the configuration described above.

The projection lens 230 enlarges and projects the image formed by the image formation portion 220, as described above. The projection lens 230 is not limited to a specific lens and may, for example, be a lens that has electrodes (not shown) and expands or contracts (has changeable thickness) in accordance with the magnitude of a voltage applied to the electrodes for adjustment of the focal length (referred to as focus adjustment). Such a lens has been known, and there is a lens having a thickness that changes, for example, from 750 to 375 micrometers when a voltage of 20 volts is applied to the electrodes.

The thus configured image projection section 200 is so disposed in the lamp cover 400 that the optical axis ax1 of the image projection section 200 substantially coincides with a central axis L1 of the lamp cover, which passes through a rear end 400a of the lamp cover 400 and a front end 400b thereof.

In the illumination apparatus 10 according to the first embodiment, the connection section 300 is assumed to be the same as a base (base defined as "E26", for example) provided on a typical light bulb (such as incandescent light bulb, light-bulb-type fluorescent lamp, and LED bulb). The illumination apparatus 10 according to the first embodiment can therefore be connected to an illumination apparatus fixture (not shown), such as a light bulb attachment socket or a light bulb attachment receptacle, by screwing the connection section (base) 300 into the illumination apparatus fixture, as in the case of the typical light bulbs described above.

The lamp cover 400, the rear end 400a of which is attached to the connection section 300, is formed integrally with the connection section 300. The lamp cover 400 has a light transmissive portion 420, which is a predetermined area including the front end 400b. The light transmissive portion 420 has a substantially hemispherical shape and can transmit illumination light from the illumination light source 100 and an image projected from the image projection section 200. Further, the portion between the light transmissive portion 420 and the connection section (base) 300 forms a trumpet-shaped body portion 430.

At least an image transmitting area A (area indicted by thick line in FIG. 1), which is part of the light transmissive portion 420 of the lamp cover 400 and through which an image projected from the image projection section 200 passes, is made of a polymer dispersed liquid crystal material (PDLC) 440. An area B (see FIG. 1), which is the remainder of the light transmissive portion 420 of the lamp cover 400 and is not made of the polymer dispersed liquid crystal material 440, is formed of a light diffusing member 450, which can diffuse the illumination light from the illumination light source 100. It is assumed that the light diffusing member 450 is made of a white, cloudy glass material that can diffuse the illumination light from the illumination light source 100.

The polymer dispersed liquid crystal material 440 (hereinafter also referred to as PDLC 440) is controlled by the control section 600. That is, in a normal state in which no voltage is applied to the PDLC 440 (in which no image is projected), the PDLC 440 is white and cloudy. In a state in which an image is projected, the control section 600 applies a predetermined voltage to the PDLC 440 to make it transparent.

In the lamp cover 400, a disk-shaped separation member 460, which separates the light transmissive portion 420 and the body portion 430 from each other, is provided between the light transmissive portion 420 and the body portion 430. The control section 600 is disposed on the rear surface of the separation member 460 (surface facing body portion 430). More specifically, the control section 600 is disposed on a circuit substrate (not shown) provided on the rear surface of the separation member 460.

A heat sink 470 is so provided between the separation member 460 and the connection section 300 that the heat sink 470 surrounds the image projection section 200. The heat sink 470 basically dissipates heat generated by the image projection light source 211 and is also effective in dissipating heat generated by the illumination light source 100. Further, a cooling fan 480 is provided in the vicinity of the power source section 500. The fan 480 is, however, not an essential component.

A tubular member (assumed to be cylindrical member) 490, which does not block an image projected from the image projection section 200 but transmits the image, is provided on the image exit side of the image projection section 200 (side where projection lens 230 is present). Specifically, the cylindrical member 490 is so disposed on the image exit side of the image projection section 200 that the central axis of the cylindrical member 490 coincides with the central axis L1 of the lamp cover (optical axis ax1 of image projection section 200).

A tapered surface 491, the inner diameter of which increases with distance from the image projection section 200, is formed along the inner side surface of the cylindrical member 490. The tapered angle θ of the tapered surface 491 is so set that it substantially corresponds to the greatest spread angle of an image having exited out of the projection lens 230.

The illumination light source 100 is formed of a plurality of LEDs 101 (hereinafter referred to as illumination LEDs), as described above. The illumination LEDs 101 are not only disposed in positions set apart from an area through which an image projected from the image projection section 200 passes but also so disposed that they surround the central axis L1 of the lamp cover (optical axis ax1 of image projection section 200). In the illumination apparatus 10 according to the first embodiment, the illumination LEDs 101 are so disposed that they form rows arranged at predetermined intervals on the outer side surface of the cylindrical member 490.

Figure 2A:
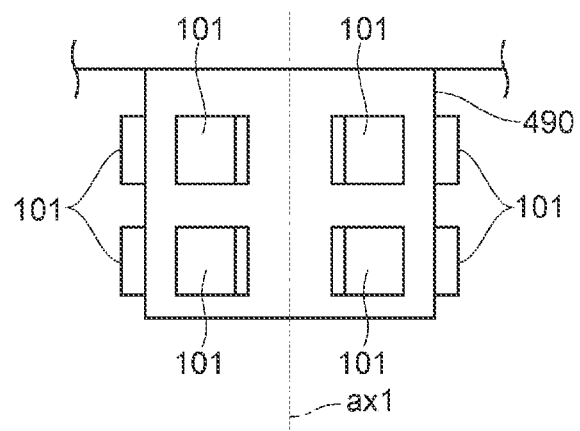
FIGS. 2A and 2B are descriptive diagrams of an example of the arrangement of illumination LEDs that form an illumination light source.
Figure 2B:
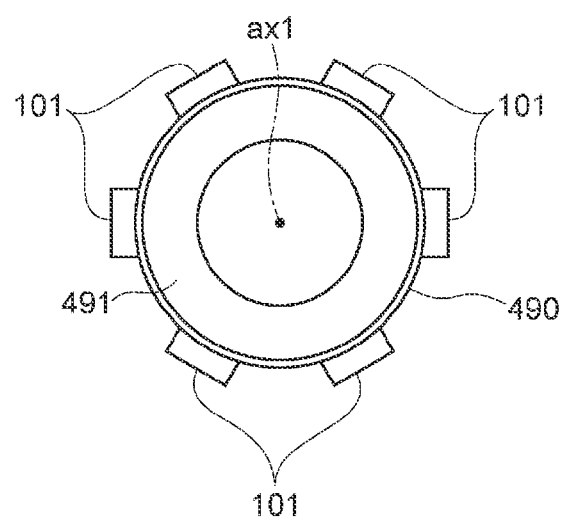

FIGS. 2A and 2B are descriptive diagrams of an example of the arrangement of the illumination LEDs 101, which form the illumination light source 100. FIGS. 2A and 2B show the cylindrical member 490 extracted from the structure shown in FIG. 1. FIG. 2A is a side view of the cylindrical member 490, and FIG. 2B shows the cylindrical member 490 viewed from the front end 400b of the lamp cover 400. The illumination LEDs 101 are so disposed on the outer side surface of the cylindrical member 490 that they form rings arranged at predetermined intervals as shown in FIGS. 2A and 2B.

Specifically, the illumination LEDs 101 are so disposed that they form rows in the circumferential direction of the outer side surface of the cylindrical member 490. In the illumination apparatus 10 according to the first embodiment, a plurality of rows (two rows in FIG. 1) of illumination LEDs are provided on the outer side surface of the cylindrical member 490 in the vertical direction in FIG. 2A. FIGS. 2A and 2B show a case where six illumination LEDs 101 are disposed in each of the rows by way of example, but the number of illumination LEDs 101 can be set as appropriate.

In the illumination apparatus 10 according to the first embodiment, the illumination LEDs 101 in the two rows are disposed in aligned positions in the direction along the central axis of the cylindrical member 490 by way of example. The illumination LEDs 101 are not necessarily arranged this way and may be arranged in a staggered configuration in the rows, or the number of illumination LEDs in the two rows differs from each other.

Referring back to FIG. 1, the control section 600 can control the illumination light source 100 and the image projection section 200 independently of each other, and a user who operates an operation switch 800 (see FIG. 4), which will be described later, can selectively set any of the following functions in accordance with user's operation: an illumination function of performing illumination by using the illumination light source 100; an image projection function of performing image projection by using the image projection section 200; and an illumination/image projection combined function of performing both the illumination function and the image projection function. In the following description, the illumination function, the image projection function, and the illumination/image projection function, which allows the illumination function and the image projection function to be performed in a combined manner, are called an illumination mode, an image projection mode, and a combined mode, respectively, in some cases.

The control section 600 further has a function of controlling the PDLC 440. That is, the control section 600 controls the PDLC 440 in such a way that the PDLC 440 is made transparent when the image projection section 200 projects an image whereas the PDLC 440 is made white and cloudy to diffuse light when the image projection section 200 projects no image.

The control section 600, which has the functions described above, may further have a communication function that allows the illumination apparatus 10 to be connected, for example, to a network, and it is assumed that the illumination apparatus 10 according to the first embodiment has the communication function. The illumination apparatus 10 having such a communication function can acquire image information to be projected over, for example, a network before the illumination apparatus 10 performs image projection.

The control section 600 can be a single control section that accommodates an illumination controller (not shown) for controlling the illumination light source 100 and an image projection controller (not shown) for controlling the image projection section 200, or the illumination controller and the image projection controller can be separate components. It is assumed in the illumination apparatus 10 according to the first embodiment that the control section 600 is a single control section that accommodates an illumination controller and an image projection controller.

The control section 600 controls the illumination light source 100 in such a way that the control section 600 can turn on and off the illumination LEDs 101, which form the illumination light source 100, and can change the luminance of the illumination LEDs 101. When the illumination light source 100 is formed of LEDs that emit light fluxes of a plurality of colors, the control section 600 can, for example, switch the color of the overall emitted light from one to another. Further, the control section 600 performs a variety of types of control on image projection. Specific examples of the variety of types of control will be described later.

The user who operates the operation switch 800 (see FIG. 4), which will be described later, of the thus configured illumination apparatus 10 according to the first embodiment can selectively set any of the following three modes: the illumination mode, the image projection mode, and the combined mode, as described above.

The illumination mode is a mode in which image projection using the image projection section 200 is not performed but only illumination using the illumination light source 100 is performed, or in the illumination mode, the illumination apparatus 10 according to the first embodiment is used in the same manner as a typical illuminator is used. Only the illumination LEDs 101, which form the illumination light source 100, are therefore turned on in the illumination mode. When the illumination light source 100 is formed of LEDs that emit light fluxes of a plurality of colors, the following types of light emission control are possible: illumination using a single-color combined light flux, which is basic operation; light emission from only a specific color LED among the plurality of colors; and simultaneous combined light emission of two or more color light fluxes. Controlling the color of the emitted light as described above allows the illumination apparatus 10 to be used as an illumination apparatus that provides a special atmosphere.

In the image projection mode, the illumination apparatus 10 according to the first embodiment is used as an image projection apparatus (projector), and illumination using the illumination light source 100 is not performed but only image projection using the image projection section 200 is performed. In the image projection mode, for example, a preferred image prepared in advance for projection (images of landscape and starry sky, for example) and an image acquired, for example, over a network can be projected. Further, in the image projection mode, spotlight-like illumination using white light can be performed by projecting a white plain image.

The combined mode, in which a combination of the illumination using the illumination light source 100 and the image projection using the image projection section 200 is performed, allows projection of a preferred image with illumination performed by the illumination light source 100.

According to the illumination apparatus 10 of the first embodiment, one of the illumination mode, the image projection mode, and the combined mode can be selectively set in accordance with a variety of scenes, as described above. The illumination apparatus 10 according to the first embodiment can therefore provide the illumination function and the image projection function in accordance with a variety of situations.

Figure 3:
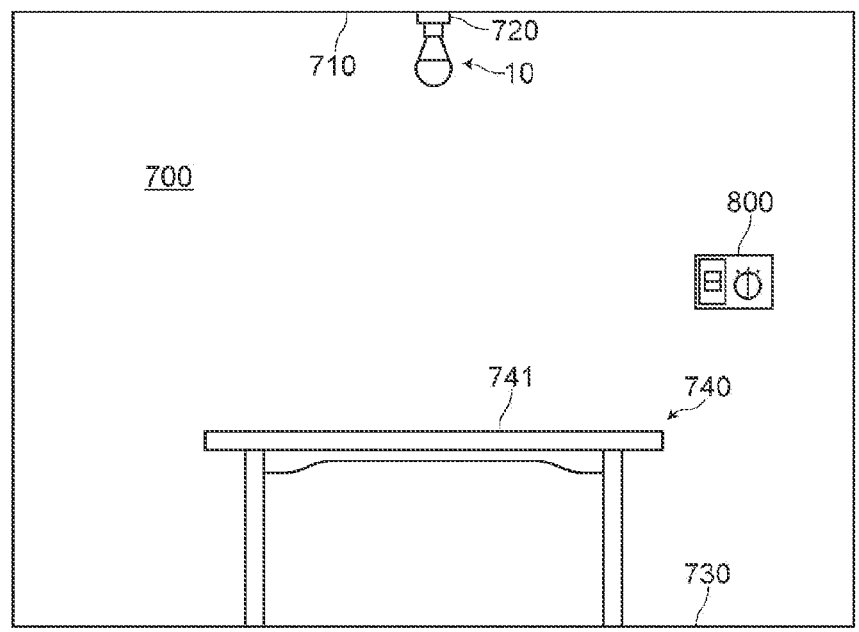
FIG. 3 is a descriptive diagram of an example in which the illumination apparatus according to the first embodiment is installed.

FIG. 3 is a descriptive diagram of an example in which the illumination apparatus 10 according to the first embodiment is installed. FIG. 3 shows a case where the illumination apparatus 10 according to the first embodiment is installed in a dining room 700 in a typical residence by way of example. In this case, the illumination apparatus fixture is a light bulb attachment receptacle 720 (hereinafter abbreviated to receptacle 720) originally attached to a ceiling 710 of the dining room 700. The user can therefore attach the illumination apparatus 10 according to the first embodiment by screwing the connection section 300 (see FIG. 1) into the receptacle 720. Further, the illumination apparatus 10 according to the first embodiment is so attached that it uses a predetermined area of a surface 741 of a table 740 placed on a floor 730 of the dining room 700 as a projection surface and projects an image on the projection surface.

The user can operate the illumination apparatus 10 by using the operation switch 800 attached to a wall or any other surface of the dining room 700. That is, the operation switch 800 allows the user to not only power on and off the illumination apparatus 10 but also switch the operation mode thereof among the illumination mode, the image projection mode, and the combined mode. A remote control may alternatively be provided, and the remote control may be used to operate the illumination apparatus 10. Additionally, a mobile terminal or any other device may be used to operate the illumination apparatus 10.

Figure 4:
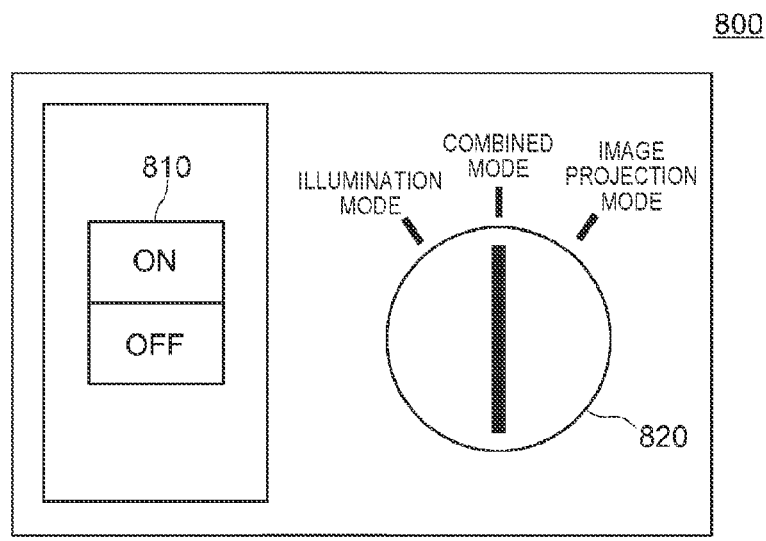
FIG. 4 shows an example of an operation switch that allows a user to operate the illumination apparatus according to the first embodiment.

FIG. 4 shows an example of the operation switch 800 that allows the user to operate the illumination apparatus 10 according to the first embodiment. The operation switch 800 includes a power switch 810, which allows the user to power on and off the illumination apparatus 10 according to the first embodiment, and a mode switch 820, as shown in FIG. 4. The power switch 810 starts and stops supplying electric power to the illumination apparatus 10 according to the first embodiment. The mode switch 820 switches the operation mode of the illumination apparatus 10 according to the first embodiment among the illumination mode, the image projection mode, and the combined mode described above.

In FIG. 4, the mode switch 820 is a rotary-dial-type switch by way of example. The mode switch 820 is not limited to a rotary dial type and may be any type capable of the mode switching. For example, the mode switch 820 can be a push button. When the mode switch 820 is a push button, three push buttons corresponding to the illumination mode, the image projection mode, and the combined mode are provided, and the user is allowed to press any of the three push buttons to select the mode corresponding to the pressed push button.

The mode available immediately after the power switch 810 is turned on may be set in accordance with which mode the mode switch 820 has been set at before the power switch 810 is turned on.

For example, in a case where the mode switch 820 has been set at the illumination mode before the power switch 810 is turned on, the illumination apparatus 10 operates in the illumination mode after the power switch 810 is turned on, and in a case where the mode switch 820 has been set at the image projection mode before the power switch 810 is turned on, the illumination apparatus 10 operates in the image projection mode after the power switch 810 is turned on. The operation mode is thus set in accordance with which mode the mode switch 820 has been set at before the power switch 810 is turned on.

The illumination apparatus 10 may instead operates in the illumination mode whenever the power switch 810 is turned on. In this case, the mode switch 820 is preferably formed of the push buttons. The mode setting described above can be achieved by creating software that resets the mode switch 820 to the illumination mode when the illumination apparatus 10 according to the first embodiment is powered off.

The thus created software resets the mode switch 820 to the illumination mode, for example, even when the user stops using the illumination apparatus 10 according to the first embodiment operating in the image projection mode and turns off the power switch 810, and causes the illumination apparatus 10 according to the first embodiment to always operate in the illumination mode when the user turns on the power switch 810 next time.

Figure 5:
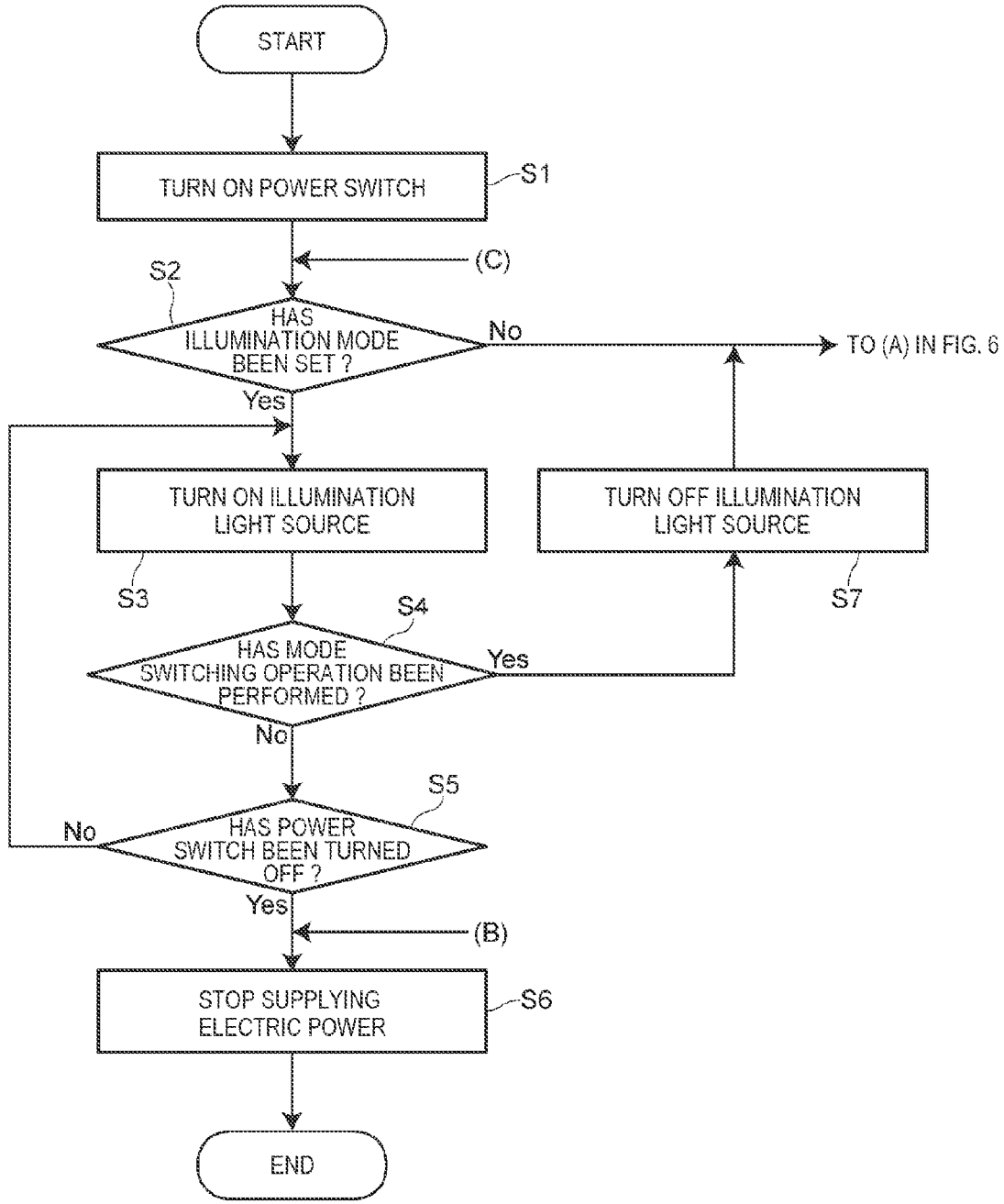
FIG. 5 is a flowchart for describing the action of the illumination apparatus according to the first embodiment.
Figure 6:
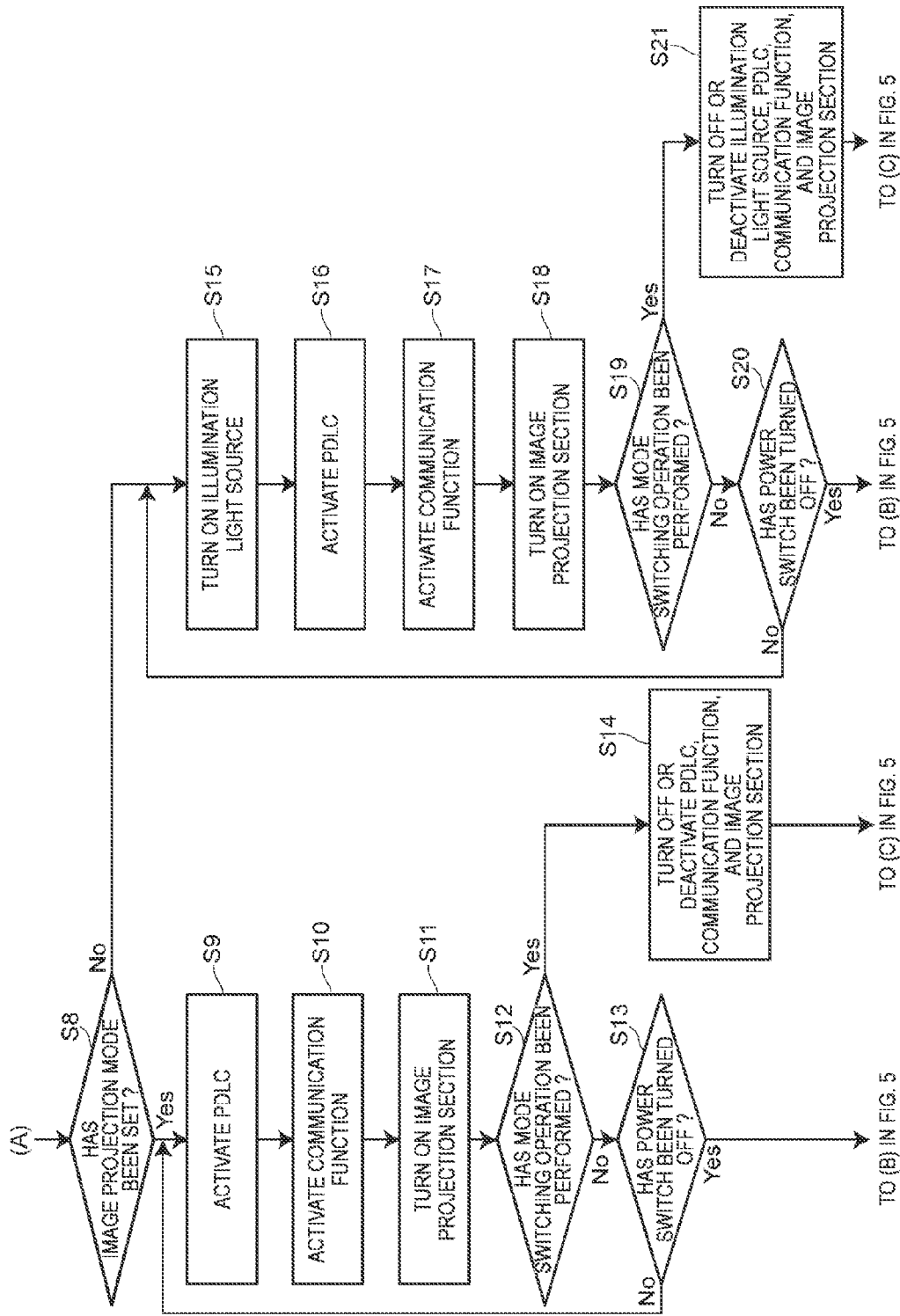
FIG. 6 is another flowchart for describing the action of the illumination apparatus according to the first embodiment.

FIGS. 5 and 6 are flowcharts for describing the action of the illumination apparatus 10 according to the first embodiment. The flowcharts shown in FIGS. 5 and 6, which primarily describe the action performed by the control section 600 of the illumination apparatus 10, also includes part of operation performed by the user. The flowcharts shown in FIGS. 5 and 6 show a case where it is determined which mode the mode switch 820 has been set at before the power switch 810 is turned on and the illumination apparatus 10 caries out a process according to the mode having been set before it is turned on.

When the user turns on the power switch 810 (see FIG. 4) (step S1), it is determined whether or not the mode switch 820 has been set at the "illumination mode" (step S2). When the illumination mode has been set ("YES" in step S2), the illumination light source 100 is turned on (illumination LEDs are turned on) (step S3). In this state, the illumination apparatus 10 according to the first embodiment operates in the illumination mode.

In this state (in which the illumination light source 100 emits light), it is determined whether or not mode switching operation has been performed (step S4), and it is also determined whether or not the power switch 810 has been turned off (step S5). When no mode switching operation has been performed (operation mode is still set at illumination mode) and the power switch 810 has not been turned off ("NO" in steps S4 and S5), the illumination mode is maintained.

When no mode switching operation has been performed (operation mode is still set at illumination mode) but the power switch 810 has been turned off ("NO" in step S4 but "YES" in S5), the electric power supply is terminated (step S6). The illumination apparatus 10 according to the first embodiment therefore stops operating.

When it is determined in step S2 that the illumination mode has not been set ("NO" in step S2), the control proceeds to (A) in FIG. 6. That is, it is determined whether or not the image projection mode has been set (step S8). Further, when the illumination light source 100 emits light and mode switching operation is performed ("YES" in step S4), the control also proceeds to (A) in FIG. 6. More specifically, when the illumination light source 100 emits light and mode switching operation is performed, the illumination light source 100 is turned off (step S7) and then the control proceeds to (A) in FIG. 6.

When it is determined in step S8 in FIG. 6 that the image projection mode has been set ("YES" in step S8), the PDLC 440 formed in the light transmissive portion 420 of the lamp cover 400 is activated, that is, a predetermined voltage is applied to the PDLC 440 (step S9). The PDLC 440 formed in the light transmissive portion 420 is thus changed from the white, cloudy state to the transparent state.

Thereafter, the communication function is activated (step S10), and the image projection section 200 is turned on (step S11). A state in which image projection can be performed is thus achieved, whereby the image projection section 200 can project an image, for example, on a table. Activating the communication function allows the illumination apparatus 10 according to the first embodiment to be connected, for example, to a network and acquire an image that the user desires to project also from, for example, the network.

In the state in which the image projection section 200 is kept turned on, it is determined whether or not mode switching operation has been performed (step S12) and whether or not the power switch 810 has been turned off (step S13). When no mode switching operation has been performed (operation mode is still set at image projection mode) and the power switch 810 has not been turned off ("NO" in steps S12 and S13), the image projection mode is maintained.

When no mode switching operation has been performed (operation mode is still set at image projection mode) and the power switch 810 has been turned off ("NO" in step S12 but "YES" in step S13), the control proceeds to (B) in FIG. 5. That is, the control proceeds to step S6 in FIG. 5, and the electric power supply is terminated (step S6). The illumination apparatus 10 according to the first embodiment therefore stops operating.

On the other hand, when it is determined in step S12 that mode switching operation has been performed ("YES" in step S12), the PDLC 440, the communication function, and the image projection section 200 are turned off or deactivated, (step S14), and then the control proceeds to (C) in FIG. 5. That is, the control proceeds to step S2 in FIG. 5, and it is determined whether or not the mode after the switching operation is the illumination mode. When the mode after the switching operation is the illumination mode, the illumination light source 100 is turned on (step S3), and the illumination apparatus 10 operates in the illumination mode.

When it is determined in step S2 that the mode after the switching operation is not the illumination mode, the control proceeds to (A) in FIG. 6. That is, the control proceeds to step S8 in FIG. 6, and it is determined whether or not the image projection mode has been set. In this case, since the mode switching operation has been performed in the image projection mode, it is determined in step S8 that the image projection mode has not been set and the control proceeds to step S15 in FIG. 6. That is, the process in step S15 and the following processes are those in the combined mode, in which the illumination light source 100 is turned on (step S15), the PDLC 440 is activated (step S16), the communication function is activated (step S17), and the image projection section 200 is turned on (step S18). The illumination apparatus 10 according to the first embodiment thus operates in the combined mode, in which illumination and image projection are both performed.

In the state in which the combined mode is set, it is determined whether or not mode switching operation has been performed (step S19) and whether or not the power switch 810 has been turned off (step S20). When no mode switching operation has been performed (illumination apparatus still operates in combined mode) and the power switch 810 has not been turned off ("NO" in steps S19 and S20), the combined mode is maintained.

When no mode switching operation has been performed (illumination apparatus still operates in combined mode) and the power switch has been turned off ("NO" in step S19 but "YES" in step S20), the control proceeds to (B) in FIG. 5. That is, the control proceeds to step S6 in FIG. 5 and the electric power supply is terminated at this point. The illumination apparatus 10 according to the first embodiment therefore stops operating.

On the other hand, when it is determined in step S19 that mode switching operation has been performed ("YES" in step S19), the illumination light source 100, the PDLC 440, the communication function, and the image projection section 200 are turned off or deactivated (step S21), and the control then proceeds to (C) in FIG. 5. That is, the control proceeds to step S2 in FIG. 5. In this case, when it is determined in step S2 that the operation mode is the illumination mode, the control proceeds to step S3, whereas when it is determined in step S2 that the operation mode is not the illumination mode, the control proceeds to (A) in FIG. 6.

When the power switch 810 is turned on in step S1 in FIG. 5 and it is then determined in step S2 in FIG. 5 that the operation mode is not the illumination mode ("NO" in step S2), the control proceeds to step S8 in FIG. 6, where it is determined whether or not the operation mode is the image projection mode. When it is determined in step S8 that the operation mode is the image projection mode ("YES" in step S8), the operation mode is changed to the image projection mode, whereas when it is determined in step S8 in FIG. 6 that the operation mode is not the image projection mode ("NO" in step S8), it is determined that the operation mode is the combined mode and the control proceeds to step S15.

In the flowcharts shown in FIGS. 5 and 6, when it is determined whether or not mode switching operation has been performed (steps S4, S12, and S19) and the determination result shows that mode switching operation has been made, the portion operating in the mode (mode before switching operation) (for example, the illumination light source 100 in a case where the mode before the switching operation is the illumination mode, the PDLC 440, the communication function, and the image projection section 200 in a case where the mode before the switching operation is the image projection mode, and so on) is temporarily turned off (steps S7, S14, and S21, for example). The turning-off process is, however, not necessarily carried out.

For example, when mode switching operation changes the operation mode to a new one, it may be determined which of the illumination light source 100, the PDLC 440, the communication function, and the image projection section 200 should be turned on and which of them should be turned off in the new mode, and the turning on and off operation may then be performed. As an example, when the image projection mode is changed to the combined mode, the PDLC 440, the communication function, and the image projection section 200 having operating in the image projection mode may be kept operating, and only the illumination light source 100 may newly be turned on.

As described above, the illumination apparatus 10 according to the first embodiment can be so set that it operates in any of the illumination mode, the image projection mode, and the combined mode. When the illumination apparatus 10 is so set that it operates in the illumination mode, the light transmissive portion 420 of the lamp cover 400 is entirely white and cloudy, whereby diffused light illumination can be performed. On the other hand, when the illumination apparatus 10 is so set that it operates in the projection mode or the combined mode, a voltage is applied to the PDLC 440 formed in the light transmissive portion 420 of the lamp cover 400 and hence the image transmitting area A becomes transparent, whereby a clear image can be projected.

Even in the image projection mode, image projection can be performed with the entire light transmissive portion 420 of the lamp cover 400 maintained white and cloudy. In this case, the image can be intentionally "blurred," which provides a rendering effect in which a special atmosphere can be created depending on the type of the image and situations where the image is projected.

Conversely, even in the illumination mode, in which only illumination is performed, only the portion where the PDLC 440 is formed, that is, the image transmitting area A can be made transparent by applying a voltage to the PDLC 440. In this case, spotlight-like illumination, in which a specific area is made brighter than the other areas, can be performed while the entire room is illuminated. Further, since the control section 600 can control the luminance and color of the light emitted from the illumination light source 100, optimum illumination can be performed in accordance with a scene in question.

In the combined mode, since illumination and image projection can be simultaneously performed, a variety of rendering effects can be provided. For example, at dinner, a preferred image can be projected under dim lighting, providing an atmosphere with a rich taste.

Further, since the connection section 300 of the illumination apparatus 10 according to the first embodiment is electrically connectable to an existing illumination apparatus fixture, the illumination apparatus according to the embodiment of the invention can be readily attached to the illumination attachment fixture as in a case where a typical illumination apparatus is attached. Moreover, since the illumination apparatus 10 according to the first embodiment can also be readily removed, the location where the illumination apparatus 10 is installed can be readily changed, whereby the illumination apparatus 10 according to the first embodiment can render light and images wherever the illumination apparatus is installed.

Second Embodiment

Figure 7:
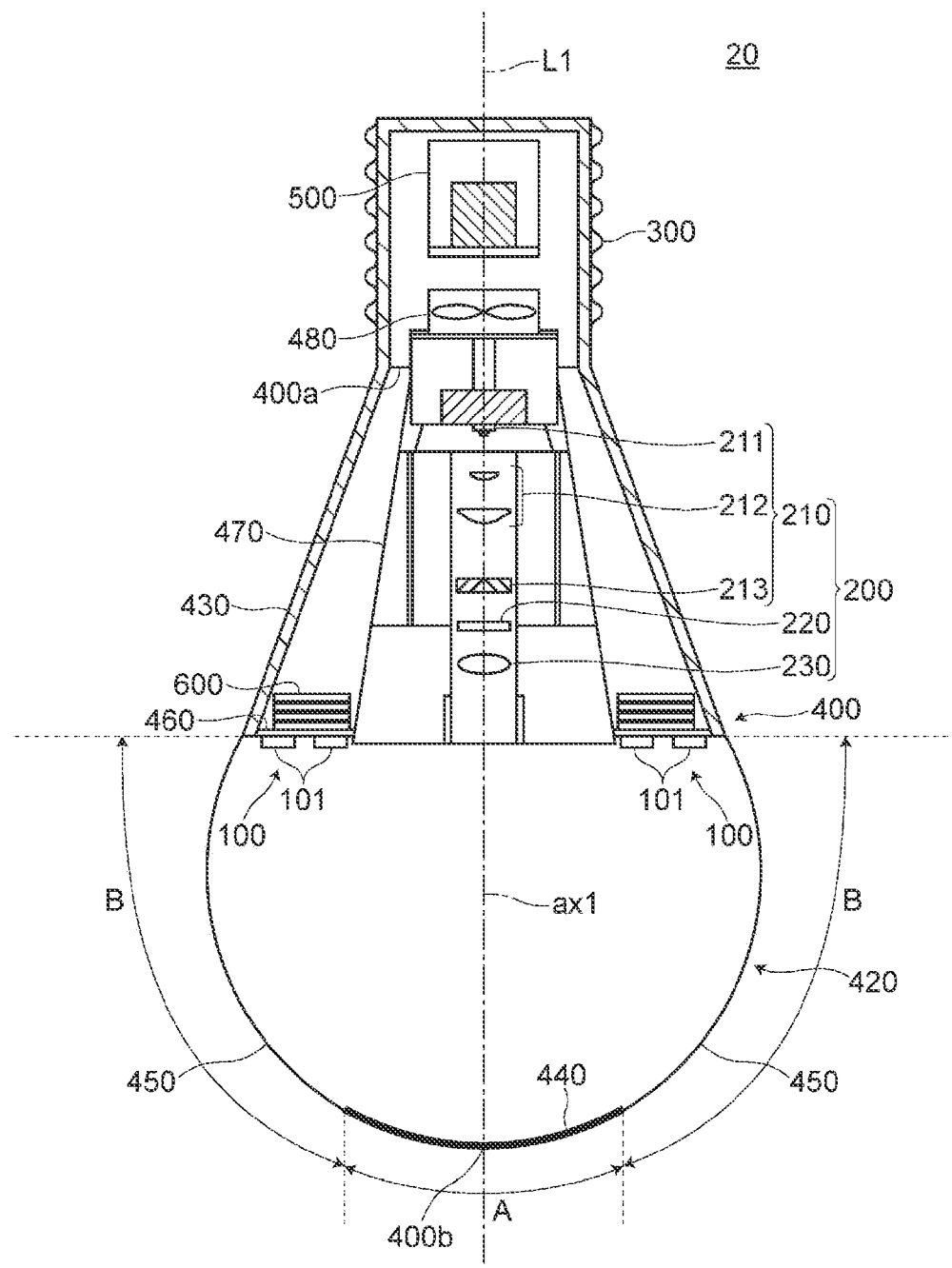
FIG. 7 is a descriptive diagram of an illumination apparatus according to a second embodiment.

FIG. 7 is a descriptive diagram of an illumination apparatus 20 according to a second embodiment. The illumination apparatus 20 according to the second embodiment includes no cylindrical member 490, and the illumination LEDs 101, which form the illumination light source 100, are provided on the disk-shaped separation member 460, as shown in FIG. 7. The configuration shown in FIG. 7 differs from that shown in FIG. 1 only in terms of the presence of the cylindrical member 490 and the arrangement of the illumination LEDs 101, and the other configurations are the same as those in FIG. 1. The same components as those in FIG. 1 therefore have the same reference characters.

Figure 8:
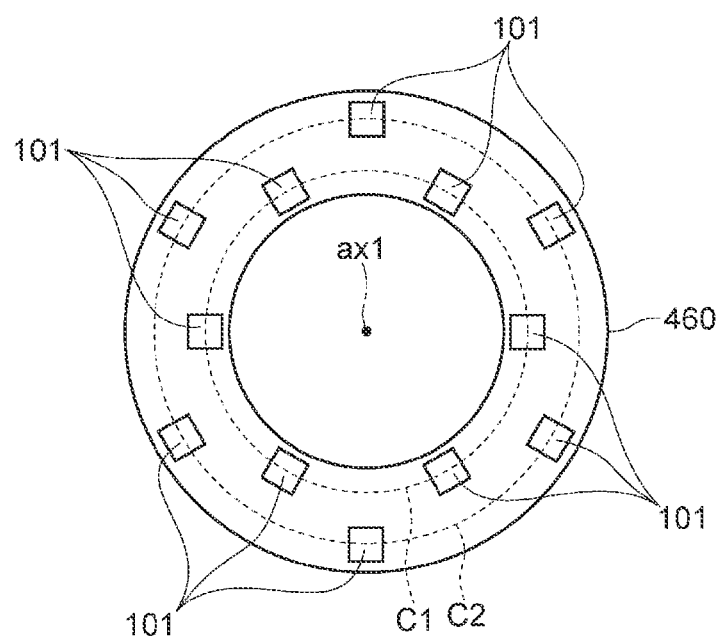
FIG. 8 is a plan view showing a disk-shaped separation member extracted from the illumination apparatus.

FIG. 8 is a plan view showing the disk-shaped separation member 460 extracted from the entire structure. FIG. 8 shows the front surface of the disk-shaped separation member 460, that is, the separation member 460 viewed from the front end 400b of the lamp cover 400. The illumination LEDs 101, which form the illumination light source 100, are not only disposed in positions set apart from the area through which an image projected from the image projection section 200 passes but also so disposed that they surround the central axis L1 of the lamp cover (optical axis ax1 of image projection section 200), as in the illumination apparatus 10 according to the first embodiment.

In the illumination apparatus 20 according to the second embodiment, the illumination LEDs 101 are disposed on the front surface of the disk-shaped separation member 460 along a circle around the optical axis ax1 of the image projection section 200 at predetermined intervals, as shown in FIG. 8. Further, in the illumination apparatus 20 according to the second embodiment, the circle around the optical axis ax1 of the image projection section 200 is formed of a plurality of circles (two circles C1 and C2 in this case) having radii different from each other, and two rows are formed along the two circles C1 and C2. In FIG. 8, in which the circles C1 and C2 are drawn with the broken lines, the circles C1 and C2 are drawn for ease of description and no circles are actually drawn.

In the illumination apparatus 20 according to the second embodiment, six illumination LEDs 101 are disposed in each of the rows byway of example, but the number of illumination LEDs 101 can be set as appropriate. Further, in FIG. 8, the illumination LEDs 101 are disposed in a staggered pattern along the radial direction of the circles by way of example, but the illumination LEDs 101 are not necessarily arranged this way. Further, the number of illumination LEDs 101 along one of the two circles C1 and C2 may differ from the number of illumination LEDs 101 along the other circle.

The illumination apparatus 20 according to the second embodiment differs from the illumination apparatus 10 according to the first embodiment only in terms of the arrangement of the illumination LEDs 101 and is the same as the illumination apparatus 10 according to the first embodiment in terms of the other configurations and actions, and no description thereof will therefore be made.

The invention has been described based on the above embodiments, but the invention is not limited thereto. A variety of changes can be made to the extent that they do not depart from the substance of the invention. For example, the following variations are conceivable.

(1) In the illumination apparatus 10 according to the first embodiment, the illumination LEDs 101, which form the illumination light source 100, are disposed on the outer side surface of the cylindrical member 490, and in the second embodiment, the illumination LEDs 101 are disposed on the front surface of the disk-shaped separation member 460. The place where the illumination LEDs 101 are disposed is not limited thereto or any other specific place and can be disposed in any positions set apart from the area where an image projected from the image projection section 200 passes and allowing the light from the illumination LEDs 101 to be diffused in a substantially uniform manner in a room where the illumination apparatus is installed.

(2) The type and shape of the illumination apparatus 10 according to the first embodiment are not limited to those shown in the first embodiment described above. For example, the illumination apparatus 10 has a light-bulb shape in the above embodiment but does not necessarily have a light-bulb shape. For example, the shape can be a spherical shape, a cylindrical shape, a rectangular columnar shape, or a variety of other shapes. The same holds true for the illumination apparatus 20 according to the second embodiment.

(3) In the illumination apparatus 10 according to the first embodiment, the case where the illumination apparatus 10 is attached to a ceiling for use is presented by way of example, but the place to which the illumination apparatus 10 is attached is not limited to a ceiling and may instead be a wall or a pillar. Further, the illumination apparatus 10 may not be attached to a ceiling, a wall, or a pillar but may be used as a handheld light. When the illumination apparatus 10 is used as a handheld light, the connection section 300 may be a component adaptable to a light bulb attachment socket for the handheld light. The same holds true for the illumination apparatus 20 according to the second embodiment.

(4) The illumination apparatus 10 according to the first embodiment of the invention is attached to an illumination apparatus fixture (receptacle 720) directly attached to a ceiling, but the illumination apparatus 10 is not necessarily attached this way. For example, when an illumination apparatus fixture (light bulb socket, for example) is hung from a ceiling by using a connection cord, the illumination apparatus 10 can be attached to the light bulb socket. The same holds true for the illumination apparatus 20 according to the second embodiment.

(5) In the illumination apparatus 10 according to the first embodiment, the connection section 300 (screwing base) is connectable to a light bulb attachment receptacle or a light bulb attachment socket by way of example, but the connection section 300 does not necessarily configured this way. For example, when the illumination apparatus fixture is a hooking ceiling or a hooking rosette attached to a ceiling, the connection section 300 may be a connection section connectable to the hooking ceiling or the hooking rosette. In this case, a connection cord may be extended from the illumination apparatus 10 or 20, and a connection section connectable to the hooking ceiling or the hooking rosette may be attached to the end of the connection cord.

Figure 9A:
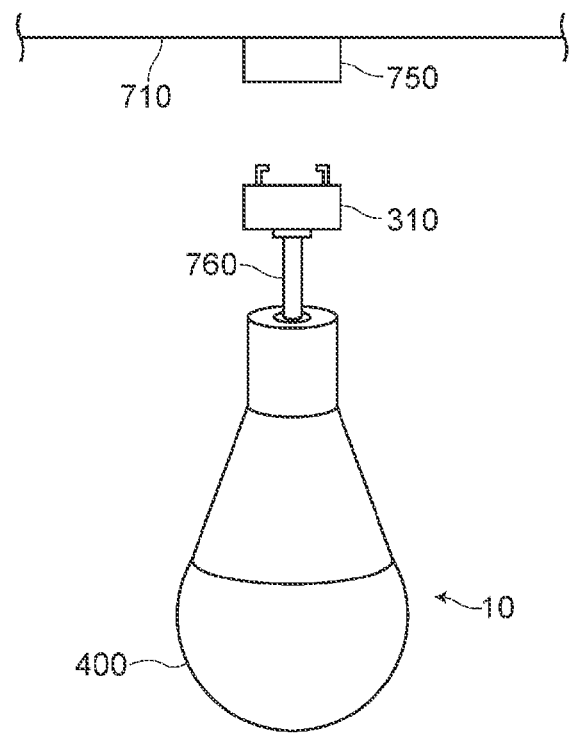
FIGS. 9A and 9B are descriptive diagrams of a case where the illumination apparatus is attached to a hooking ceiling attached to a ceiling.
Figure 9B:
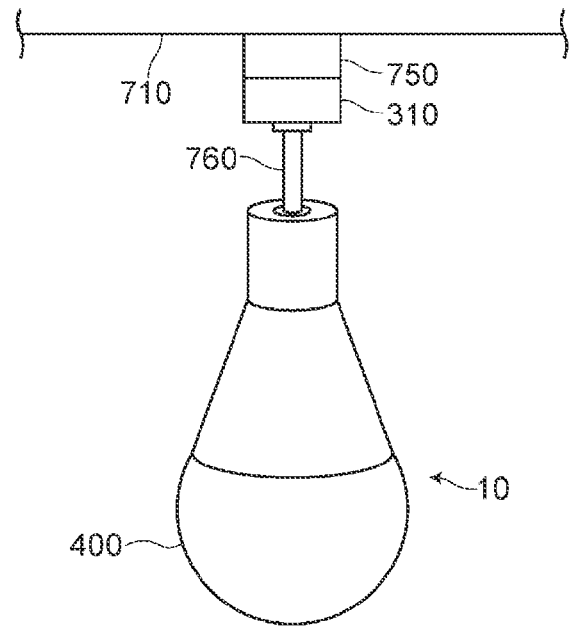

FIGS. 9A and 9B are descriptive diagrams of a case where the illumination apparatus is attached to a hooking ceiling 750 attached to the ceiling 710. In FIGS. 9A and 9B, a description will be made of a case where the illumination apparatus 10 according to the first embodiment is attached, and the illumination apparatus 20 according to the second embodiment can be attached in the same manner as the illumination apparatus 10 according to the first embodiment. In FIGS. 9A and 9B, the internal configuration of the illumination apparatus 10 is omitted.

As the connection section used when the illumination apparatus 10 is attached to the hooking ceiling 750, a connection section 310 for the hooking ceiling 750 is used, as shown in FIGS. 9A and 9B. A connection cord 760 is extended from the illumination apparatus 10, and the connection section 310 for the hooking ceiling 750 is attached to the end of the connection cord 760, as shown in FIG. 9A. The configuration described above allows the connection section 310 for the hooking ceiling to be attached to the hooking ceiling 750 attached to the ceiling 710, as shown in FIG. 9B.

In FIGS. 9A and 9B, the case where the illumination apparatus 10 according to the first embodiment is attached to the hooking ceiling 750 is presented by way of example. The illumination apparatus 10 according to the first embodiment can alternatively be attached to a hooking rosette. In this case, although not shown, a connection section for the hooking rosette may be used as the connection section of the illumination apparatus 10.

(6) Image information to be projected is not limited to an image prepared in advance or an image acquired over, for example, a network. For example, an image stored in a USB memory or any other storage device may be loaded into a personal computer (called PC), and the image information loaded into the PC may then be projected, or image information originally stored in the PC may be projected. Further, image information may be acquired from a mobile terminal or any other device over a wireless LAN, or image information compliant with the DLNA (Digital Living Network Alliance) standard may be acquired from another device compliant with the standard.

(7) In the illumination apparatus 10 according to the first embodiment, the case where the image projection section 200 is a single-panel projector is presented by way of example, but the image projection section 200 may instead be a three-panel projector including light modulators corresponding to RGB when the internal space of the lamp cover 400 is large enough. In this case, as the light source for image projection, for example, an LED that emits R (red) light, an LED that emits G (green) light, and an LED that emits B (blue) light are provided in correspondence with the light modulators (liquid crystal light modulators, for example). The same holds true for the illumination apparatus 20 according to the second embodiment.

(8) In the illumination apparatus 10 according to the first embodiment, the case where the light modulator in the image projection section 200 is a transmissive liquid crystal light modulator is presented by way of example, but the light modulator is not limited thereto. The light modulator may instead be a digital micromirror device or a reflective liquid crystal light modulator. The same holds true for the illumination apparatus 20 according to the second embodiment.

What is claimed is:

1. An illumination apparatus having an illumination function and an image projection function, the apparatus comprising:
   a light source for illumination;
   an image projection section including a light source portion having a light source for image projection different from the light source for illumination, an image formation portion that modulates light from the light source portion based on image information to be projected to form an image, and a projection lens that enlarges and projects the image formed by the image formation portion on a projection surface;
   a connection section electrically connectable to an illumination apparatus fixture;
   a lamp cover attached to the connection section, accommodating the light source for illumination and the image projection section, and having a light transmissive portion that transmits illumination light from the light source for illumination and the image projected from the image projection section; and
   a control section having a function of controlling the light source for illumination and the image projection section.

2. The illumination apparatus according to claim 1,
   wherein the lamp cover has a rear end attached to the connection section and the light transmissive portion in an area including a front end facing way from the rear end, and
   the image projection section is so disposed that an optical axis thereof coincides with a central axis of the lamp cover that passes through the rear end of the lamp cover and the front end of the lamp cover.

3. The illumination apparatus according to claim 1,
   wherein the lamp cover has a rear end attached to the connection portion and the light transmissive portion in an area including a front end facing way from the rear end, and
   the light source for illumination is formed of a plurality of solid-state light sources not only disposed in positions set apart from an area through which the image projected from the image projection section passes but also so disposed that the light sources surround the central axis of the lamp cover that passes through the rear end of the lamp cover and the front end of the lamp cover.

4. The illumination apparatus according to claim 1, wherein the control section is capable of controlling the light source for illumination and the image projection section independently of each other and selectively setting any of the functions: an illumination function of performing illumination by using the light source for illumination; an image projection function of performing image projection by using the image projection section; and an illumination/image projection function of performing both the illumination function and the image projection function in a combined manner.

5. The illumination apparatus according to claim 1, wherein at least an image transmitting area which is part of the light transmissive portion of the lamp cover and through which the image projected from the image projection section passes is made of a polymer dispersed liquid crystal material (PDLC), and an area which is the remainder of the light transmissive portion of the lamp cover and is not made of the polymer dispersed liquid crystal material is formed of a light diffusing member capable of diffusing the illumination light from the light source for illumination.

6. The illumination apparatus according to claim 5, wherein the control section further has a function of controlling the polymer dispersed liquid crystal material in such a way that the polymer dispersed liquid crystal material is made transparent when the image projection section projects an image.

7. The illumination apparatus according to claim 5, wherein the control section further has a function of controlling the polymer dispersed liquid crystal material in such a way that the polymer dispersed liquid crystal material diffuses light when the image projection section projects no image.

8. The illumination apparatus according to claim 1, wherein the connection section is connectable to any of a light bulb attachment socket, a light bulb attachment receptacle, a hooking rosette, and a hooking ceiling.

* * * * *